United States Patent [19]

Shnaid et al.

[11] Patent Number: 5,537,822
[45] Date of Patent: Jul. 23, 1996

[54] COMPRESSED AIR ENERGY STORAGE METHOD AND SYSTEM

[75] Inventors: Isaac Shnaid; Dan Weiner; Shimshon Brokman, all of Haifa, Israel

[73] Assignee: The Israel Electric Corporation Ltd., Haifa, Israel

[21] Appl. No.: 216,823

[22] Filed: Mar. 23, 1994

[30] Foreign Application Priority Data

Feb. 3, 1994 [IL] Israel ......................................... 108546

[51] Int. Cl.$^6$ ............................... F02C 6/16; F02C 7/143
[52] U.S. Cl. .................. 60/659; 60/650; 60/652; 60/684
[58] Field of Search .............................. 60/659, 650, 652, 60/682, 684; 62/87, 86, 88

[56] References Cited

U.S. PATENT DOCUMENTS

| | | | |
|---|---|---|---|
| 3,200,613 | 8/1965 | Zotos | 62/88 |
| 3,214,938 | 11/1965 | Zotos | 62/87 |
| 3,677,008 | 7/1972 | Koutz | 60/650 |
| 3,715,887 | 2/1973 | Weatherly et al. | 60/650 |
| 4,150,547 | 4/1979 | Hobson | 60/659 |
| 4,403,477 | 9/1983 | Schwarzenbach | 60/659 |
| 4,433,551 | 2/1984 | Dibrell | 62/87 |
| 4,523,432 | 6/1985 | Frutschi | 60/659 |
| 4,761,957 | 8/1988 | Eberhardt | 60/650 |
| 4,765,142 | 8/1988 | Nakhamkin | 60/659 |
| 4,829,768 | 5/1989 | Carden | 60/649 |
| 5,317,904 | 6/1994 | Bronicki | 60/659 |

*Primary Examiner*—Denise L. Gromada
*Assistant Examiner*—L. Heyman
*Attorney, Agent, or Firm*—Fitch, Even, Tabin & Flannery

[57] ABSTRACT

A compressed air energy storage (CAES) system utilizes compressed air stored in a cavity for electric power and cold production. During periods of excess power production, atmospheric air is compressed then cooled in stages using energy from a motor/generator. Condensed water is then separated from the air which is then stored in a cavity. When there is an energy demand from the CAES system, the stored compressed air is heated using heat from an external low grade energy source such as refrigerated substances, surrounding water, surrounding air, waste heat sources and solar energy. The heated compressed air is then expanded through a plurality of expansion stages to provide mechanical power to the motor/generator for generating electricity.

11 Claims, 3 Drawing Sheets

COMPRESSED AIR ENERGY STORAGE METHOD AND SYSTEM

FIELD OF THE INVENTION

The present invention relates to a compressed air energy storage (CAES) system and method. In a CAES system, an off-peak electric energy is used to compress air, the compressed air being stored in a CAES reservoir and then used during peak electricity consumption periods for the production of electric power.

BACKGROUND OF THE INVENTION

Power demand in an electric system varies considerably within the day, peaking during daytime and early evening hours and being at its minimum during the night. An electric power generating system has to be designed so as to be capable of supplying demand at peak times, and thus, during off-peak hours, a considerable proportion of an electric system generating capacity is not utilized.

In order to better the economy of an electric system, it is generally desired to find some use for the excess capacity during off-peak periods. One such use is the storage of energy during off-peak hours to be then utilized during peak consumption times to increase the energy production capacity.

There are various means for storing energy for the later production of electricity including electric energy storage in electric batteries, pumping of water into an elevated reservoir for the subsequent utilization of this water to drive a turbine to produce electricity in peak hours, as well as a CAES system. In a CAES system, air is compressed by an electrically driven compressor using off-peak electricity and stored in a compressed air reservoir. During peak electricity consumption periods, the compressed air is liberated driving turbines which produce electricity.

CAES systems are known, for example, from U.S. Pat. Nos. 3,677,008, 4,281,256, 4,391,552, 4,849,648, 4,237,692, 4,593,202, 4,765,142, 4,936,098 and 4,872,307. CAES systems generally comprise one or more electrically-activated air compressors (usually low pressure compressors in series with high-pressure compressors), a compressed energy storage or reservoir, often underground caverns, and expanders adapted to utilize the compressed air energy during its expansion for the production of electric power.

CAES systems available to date were generally provided with various auxiliary units aimed to increase the efficiency of the system. During compression, the temperature of the air rises and such heating reduces the system's storage capacity. In order to avoid this problem, it was generally the practice to provide coolers design to decrease the temperature of the air egressing from the compressors. Additionally, in prior CAES systems, various energy boosters were introduced aimed at increasing the compressed air's capacity to drive the turbine. Such energy boosters were, for example, various heaters, combustors and the like utilizing premium fuel. Specific types of such boosters were thermal energy storage systems which accumulate heat produced during the compression stage to later heat the expanding air, thus increasing the air's capacity to drive the turbine.

SUMMARY OF THE INVENTION

The present invention provides novel CAES system and method. In accordance with the present invention no use is made of premium fuel or of accumulated heat of compression in order to increase the electricity production capacity of the air egressing from the CAES. In accordance with the present invention, two embodiments are provided. In one embodiment, referred to herein at times as the "cold production embodiment", the energy production efficiency of the system is increased by the use of cold air egressing from the expanders for cold production. In this embodiment use is made of heat of refrigerated substances and of low grade heat sources. In accordance with another embodiment of the invention referred to herein as the "combination embodiment", the CAES system with cold production is combined with a gas turbine facility and use is made of heat in exhaust gases of the gas turbines to heat up the air egressing from the compressed air reservoir to increase efficiency of electricity production by the system.

In accordance with one embodiment of the invention there is provided a CAES system comprising:

a compressed air storage reservoir;

one or more compressors adapted for compression of atmospheric air and driving it into said reservoir;

one or more coolers associated with said compressors and adapted for cooling the compressed air egressing from the compressors;

electric motor means for driving said one or more compressors;

electric generator means;

one or more expanders linked to said generator means and adapted to drive said generator means by the use of power produced by expanding compressed air egressing from said reservoir; and refrigerator means associated with said one or more expanders adapted to utilize the cooled expanding air egressing from said expanders for cold production.

In accordance with said one embodiment there is also provided a CAES method, comprising:

compressing a quantity of air by one or more electrically driven compression stages, cooling the air egressing from each compression stage and driving the compressed air into a compressed air reservoir; and at need releasing a portion of the compressed air and allowing it to expand in one or more expansion stages, being adapted to derive work from the expanding air, said work being used for electric power generation, and utilizing the air egressing from the one or more expansion stages for a cold production.

In accordance with another embodiment of the invention there is provided a CAES system comprising:

a compressed air storage reservoir;

one or more compressors adapted for compression of atmospheric air and driving it into said reservoir;

one or more coolers associated with said compressors and adapted for cooling the compressed air egressing from the compressors;

electric motor means for driving said one or more compressors;

electric generator means;

one or more expanders linked to said generator means and adapted to drive said generator means by the use of power produced by expanding compressed air egressing from said reservoir; and means for heating the air egressing from said reservoir, said means being a heat exchanger, deriving heat from exhaust gases of a gas turbine.

In accordance with said another embodiment, there is also provided a CAES method, comprising:

compressing a quantity of air by one or more electrically driven compression stages, cooling the air egressing from each compression stage and driving the compressed air into a compressed air reservoir; and at need releasing a portion of the compressed air, heating the compressed air and allowing the compressed heated air to expand in one or more expansion stages adapted to derive work from the expanded air, said work being used for electric power generation; compressing another quantity of air, combusting fuel in the compressed air, expanding the combustion gases thereby deriving mechanical work, and extracting heat from the combustion gases, the heat being utilized for said heating.

A system in accordance with the combination embodiment may also have refrigerator means as in the cold production embodiment.

The electric motor means and the electric generator means are typically a combined electric motor-generator unit, having two modes of operation: a first mode in which it works as a motor by the use of electricity coming from the main electricity system; and a second mode of operation in which it serves as a generator to produce electricity which is then supplied to the main system.

The invention and its two embodiments, both of which have several modifications, will now be illustrated in the following description of specific embodiments with occasional reference to the annexed drawings.

The invention will now be illustrated with reference to specific embodiments with occasional reference to the annexed drawings.

DETAILED DESCRIPTION OF THE INVENTION

Figure 1:
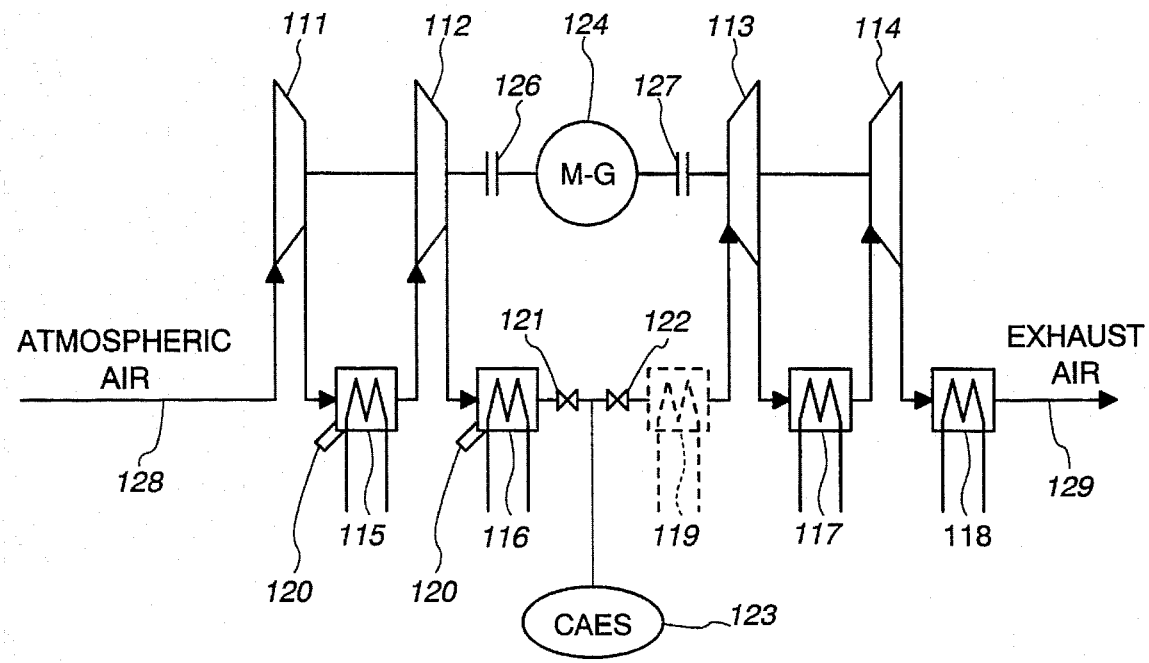
FIG. 1 is a block diagram of a CAES system in accordance with the cold production embodiment of the invention.

In the following description and the annexed drawings, several embodiments of the invention are described. In the drawings reference numerals have been used in a manner so that the component having the same function in the different embodiments were given a reference numeral with identical last two digits (e.g. compressor 111 in FIG. 1 serves a similar function to compressor 211 in FIGS. 2 and 3, respectively).

Reference is first being made to FIG. 1 showing a CAES system which utilized off-peak electricity to store energy in the form of compressed air for the subsequent simultaneous on-peak production of electricity and cold. The system comprises compressors 111 and 112, air turbo expanders 113 and 114, intercooler 115 and aftercooler 116, intermediate and final refrigerators 117 and 118, an optional heater 119, and a compressed energy storage reservoir 123. Valves 121 and 122 connect the last compressor stage 112 and the first expander stage 113, respectively, to a compressed air energy storage reservoir 123. The reservoir may be of any kind known in the art such as a salt or rock cavern, aquifers, a storage tank, etc.

The system further comprises a combined electric motor-generator unit 124 which is linked, through clutches 126 and 127, to compressors 111 and 112 and to expanders 113 and 114, respectively.

The embodiment shown in FIG. 1 comprises two compressors 111 and 112, the first being a low pressure compressor and the second being a high pressure compressor. Similarly, the system shown in FIG. 1 comprises two expander stages 113 and 114. It will no doubt be appreciated by the artisan that rather than a two-stage compression or a two-stage expansion, the system may also have three or more compression or expansion stages. Furthermore, the system may also comprise a plurality of compressors or expanders connected and operating in parallel. Similarly, as in the embodiment of FIG. 1, the embodiments shown in FIGS. 2–5 and described below, may comprise a different number of compression and expansion stages to that which is shown.

The compressors and expanders utilized in the system of the invention may be any of a variety of compressors or expanders known in the art.

Intercooler 115 and aftercooler 116 are heat exchangers designed to cool the compressed air egressing from the compressors 111 and 112, respectively. The coolers may be of any kind known in the art, and are typically based on heat exchange with either water or air provided from the surrounding by means of pipings, pumps, fans (not shown in the drawing) as known per se. The coolers may have a water separator which extracts condensed water from the air, which water may then be supplied to consumers. Such a water separator may take the form of a condensate collection tap 120 for releasing water condensed from the cooled and compressed air at the coolers 115 and 116.

Refrigerators 117 and 118 are heat exchangers in which the air egressing from the expanders is used to cool liquids, gases, various substances, materials and devices, etc.

The system in accordance with the embodiment shown in FIG. 1 as well as in the other embodiments shown in FIGS. 2–5 comprise a combined electric motor-generator unit (124 in FIG. 1) connected through clutches (126 and 127 in FIG. 1) to compressors (111 and 112 in FIG. 1) and expanders (113 and 114 in FIG. 1), respectively. It will no doubt be understood by the artisan that rather than having a combined motor-generator unit, a system of the invention may also comprise a separate electric motor driving the compressors and a separate generator driven by the expanders. It may be pointed out that a system comprising a separate electric motor and generator may operate in a mode where air is compressed and utilized for electricity and cold production, simultaneously.

During off-peak periods, the CAES system is used to charge reservoir 123 with pressurized air. During such times, clutch 126 is engaged and clutch 127 is disengaged, valve 121 is opened and valve 122 is closed. Motor-generator 124 uses electric power coming from the main facility to drive compressors 111 and 112. Air ingressing through air inlet 128 is compressed by compressors 111 and 112 and the compressed air enters through valve 121 into reservoir 123. During compression, the air is heated and then heated air is cooled by intercooler 115 and aftercooler 116: the cooling by intercooler 115 decreases the power consumed by compressor 112 and the cooling by aftercooler 116 increases the density of the compressed air and hence increases the storage capacity of reservoir 123.

During periods of peak electric power consumption, the compressed air stored in reservoir 123 is used for the combined production of electric power and cold. In this mode of operation, valve 121 is closed, valve 122 is opened, clutch 127 is engaged and clutch 126 is disengaged. Thus, air expanding in expanders 113 and 114, drives motor-generator 124, which then supplies electricity to the main facility. During expansion, the expanding air is cooled to low temperatures, and this air serves for cold production in refrigerators 72 and 73. The spent air then leaves the system through exhaust 119. During peak electric power demand which coincide with high cold demands, e.g. hot summer days, the cold produced in refrigerators 117 and 118 may be utilized directly for cooling in surrounding facilities.

In cases where produced cold cannot be used and at times of peak electric power consumption, which do not coincide with high cold demand, e.g. at evening hours during winter times, the system's capacity may be shifted from a combined electricity and cold production towards more electricity production. In such a mode of operation, the final refrigerator 118 is free of load, and the optional air heater 119 may be used for increasing the power output of expanders 113 and 114. Furthermore, heat exchanger 117 may also be used in a reverse mode of operation, i.e. to heat the air egressing from expander 113 before its entering into expander 114. Heating in heater 119 and exchanger 117 may be achieved by the surrounding air or water, by solar energy, by using hot water or steam from industrial plants, by various waste heat sources, by other low grade heat sources, etc.

In two other modes of operation, clutches 126 and 127 are engaged, valves 121 and 122 are open, whereby the compressors and the expanders are in operation simultaneously. In one of these modes, where the compressor flow rate is bigger than the air flow rate in the expanders, the system consumes electric power from the main facility, and produces simultaneously cold and compressed air which charges the CAES reservoir. In another of these modes, where the compressor flow rate is smaller than the air flow rate in the expander, the system operates in a similar manner but rather than supplying air to the reservoir, it consumes air therefrom for cold and electric energy production.

Figure 2:
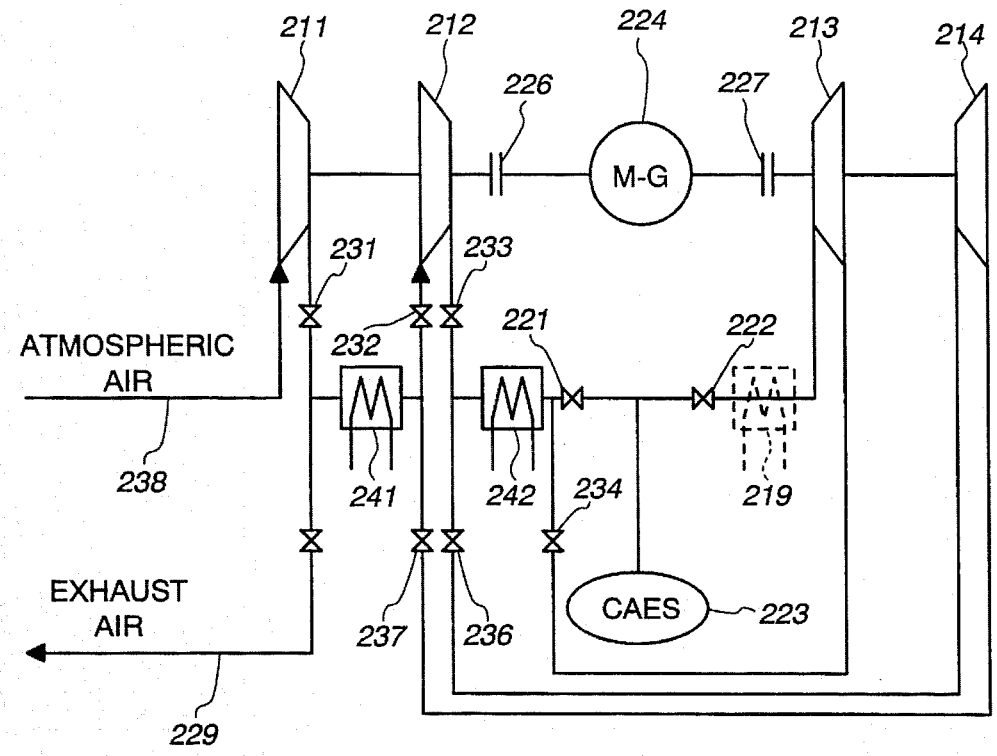
FIG. 2 shows a modification of the embodiment of FIG. 1.

Reference is now being made to FIG. 2 showing an embodiment of the invention which is a modification of the embodiment shown in FIG. 1. The system in accordance with the embodiment of FIG. 2 differs from that of FIG. 1, primarily in that rather than having separate cooler 115 and 116 and refrigerators 117 and 118, the same heat exchangers 241 and 242 are utilized to perform both functions.

In the compression mode of the embodiment of FIG. 2, valves 231, 232, 233 and 221 are opened whereas valves 222, 234, 236, 237 and 238 are closed; clutch 226 is engaged and clutch 227 is disengaged. Electric power provided to motor-generator 224, drives compressors 211 and 212 whereby air ingressing through air inlet 228, passes through compressors 211 and 212 and the compressed air enters through valve 221 into reservoir 223. Heat exchanges 241 and 242 are used to cool the air egressing from expander 211 and 212, respectively, similarly as the inter cooler and after cooler 115 and 116 in FIG. 1.

During the expansion mode of operation, valves 231, 232, 233 and 221 are closed and valves 222, 234, 236, 237 and 238 are opened. In addition, clutch 227 is engaged and clutch 226 is disengaged. Thus, air stored in reservoir 223 flows through valve 222, expander 213, heat exchanger 242, expander 214, heat exchanger 241 and then egresses through exhaust outlet 229. In this mode of operation, heat exchangers 241 and 242 serve as refrigerators similarly as refrigerators 117 and 118 in the embodiment shown in FIG. 1.

During the expansion mode, cold will be produced in heat exchangers 241 and 242, which may then be utilized as in the embodiment of FIG. 1.

In case where there is no use of produced cold or in peak electric power consumption periods which do not coincide with peak cold requirements, heat exchanger 219 and 242 may be used to heat the expanding air egressing from CAES 223 which will boost electric power production capability of the system. Heating in this mode of operation may be achieved in the same manner as in the corresponding mode of operation in the embodiment of FIG. 1.

Figure 3:
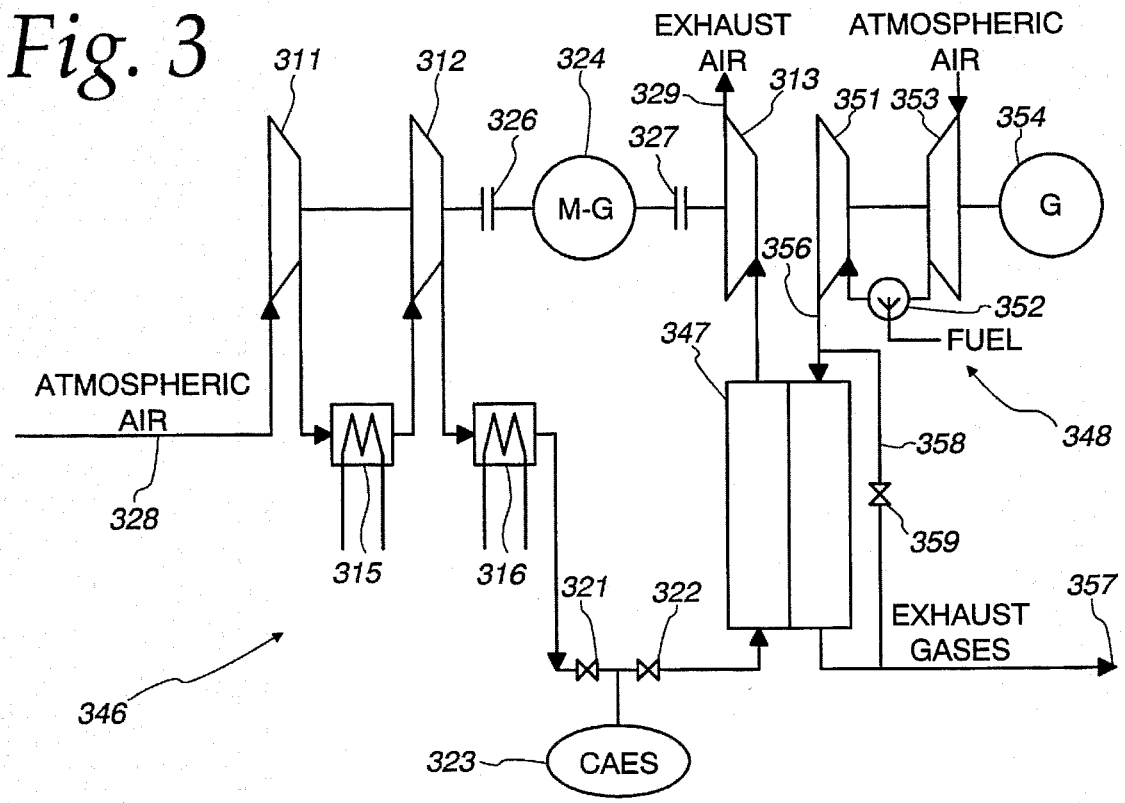
FIG. 3 is a block diagram of a CAES system according to the combination embodiment of the invention.

Reference is now being made to FIG. 3 showing a system according to the combination embodiment. For explanation of components having like function to corresponding components in the embodiment of FIGS. 1 and 2, the reader is referred to the description of these former embodiments.

The CAES system of FIG. 3 comprises three subsystems as follows:

(a) a compressed air subsystem comprising compressors 311 and 312; expander 313; motor-generator unit 324; coolers 315 and 316; compressed air reservoir 323; and the associated components;

(b) main heat exchanger 347; and (c) gas turbine subsystem 348.

Gas turbine subsystem comprises a gas expander 351, combustor 352, gas turbine compressor 353 and an electric generator 354 on a common shaft with the expander and the compressor. The expander, compressor, combustor and generator may be of a wide variety of such devices known in the art.

The exhaust outlet 356 of expander 351 is connected to heat exchanger 347, which is in turn connected to exhaust outlet 357. Bypass 358 fitted with valve 359 allows to divert gases from outlet 356 directly to exhaust outlet 357 at times when the compressed air subsystem is not used.

In heat exchanger 347, heat from the exhaust gases egressing from expander 351, is transferred to the expanding air egressing from reservoir 323, whereby the expanding air is heated and typically, air parameters reaching a pressure of 40–70 bar and a temperature of 350°–500° C. can be achieved.

One of the advantages of a system in accordance with the combined embodiment lies in that at times where the CAES subsystem cannot be used, the entire system may still be used to supply electricity to the main facility by the use of the gas turbine subsystem.

The system of the embodiment shown in FIG. 3 has three modes of operation. In a first mode of operation, the reservoir is charged with compressed air, which is similar in essence to the corresponding mode of operation in the embodiment of FIGS. 1 and 2.

In the second mode of operation, which is used during peak electricity consumption periods, the compressed air is discharged through expander 313, driving motor-generator unit 324 to produce electricity. At the same time, the gas turbine subsystem is also used for electricity production. In the gas turbine subsystem, atmospheric air is compressed in compressor 353, and by means of fuel supplied to combustor 352, the compressed air is heated, and the high temperature gases thus drive expander 351 whereby generator 354 is driven to produce electricity through the common shaft of expander 351, compressor 353 and generator 354. The electricity produced by generator 354 is then supplied to the main power facility.

Hot exhaust gases egressing from expander 351 pass through heat exchanger 347 and heat the compressed air released from reservoir 323. The heated air then expands in expander 313 producing work which drives motor-generating unit 324 supplying electric power to the main facility.

Usually, temperature of the air after passing through expander 313 is low. For example, for initial air pressure of 50 bar and a temperature of 400° C., final air temperature can be about −24° C. Generally, by a proper selection of initial values of air temperature and pressure, a temperature lower than the ambient temperature may be achieved. Thus, the exhaust air egressing from expander 313 may be used for cold production in a similar manner as shown in the embodiment of FIGS. 1 and 2 by the use of refrigerators associated with the expanders (not shown).

In a third mode of operation the compressed air subsystem is not active, valve 359 is opened whereby exhaust gases egressing from expander 351 flow through bypass 358. In this mode, only a gas turbine produces electric power.

Figure 4:
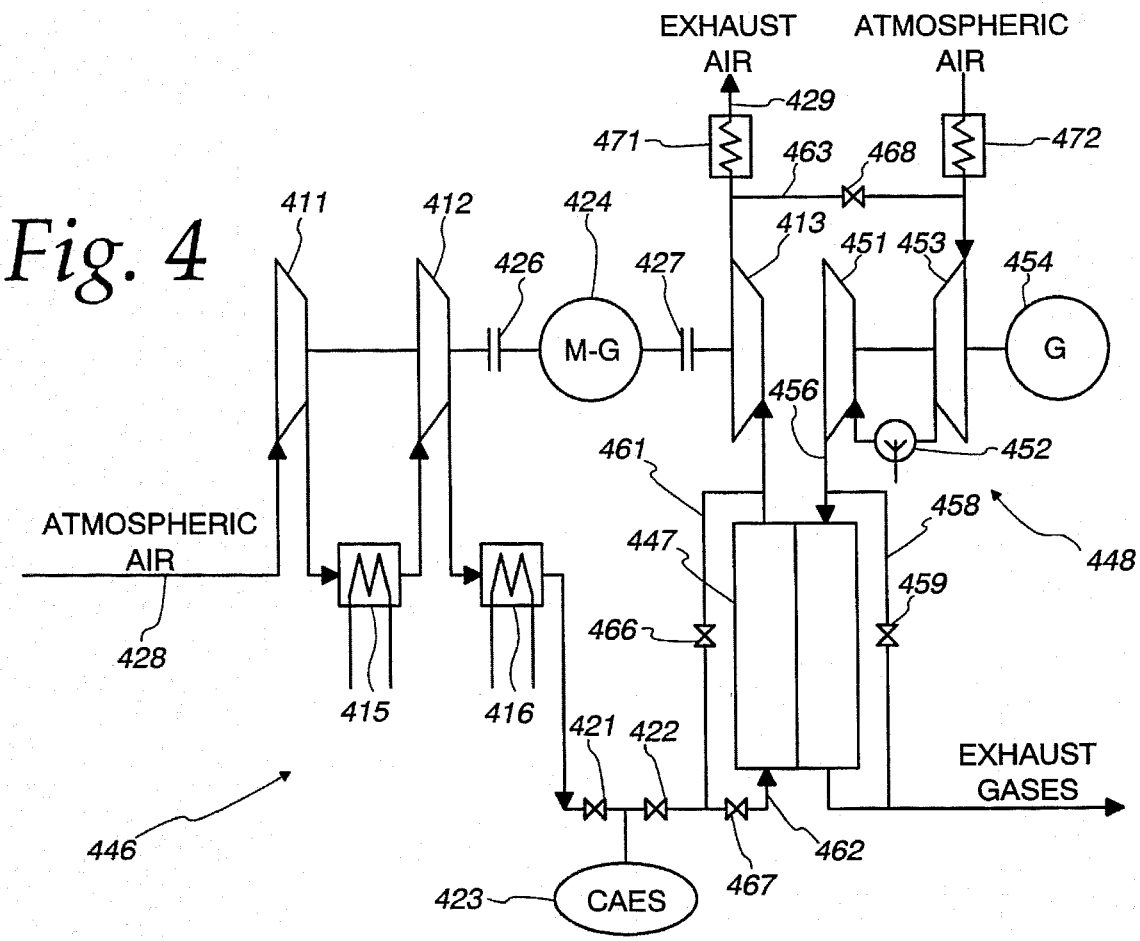
FIGS. 4 and 5 show modification of the embodiment of FIG. 3.

Reference is now being made to FIG. 4 which is a modification of the embodiment shown in FIG. 3. The embodiment of FIG. 4 is in essence similar to that of FIG. 3 but comprises valves 466, 467 and 468 fitted on air lines 461 or 462 and 463 respectively, and further comprises flow resistance units 471 and 472, which are fitted on the exhaust line of expander 413 and air intake line of compressor 453, respectively. Valves 466 and 467 together control the flow of air egressing from reservoir 423 through heat exchanger 447. When valve 466 is closed, all compressed air egressing from reservoir 423 passes through heat exchanger 447 there increasing temperature of the air supplied to expander 413 to a maximum. However, where it is desired to produce cold in a similar manner as in the embodiments of FIGS. 1 and 2, it will generally be desired that the air will not be excessively heated and thus the expanding air will be forced to flow through line 461, thus bypassing heat exchanger 447. In essence, valve systems 466 and 467 control the temperature of air entering expander 413 and hence the temperature of the exhaust air egressing from expander 413.

Owing to flow resistance unit 471, when valve system 468 is open, part of the exhaust air egressing from expander 413 will flow through line 463 and will mix with the air entering gas turbine compressor 453. Consequently, the gas turbine is supplied by cold air having high density which increases the gas turbine power output and efficiency. By accurate control of the flow of air in line 463, by valve 468, the temperature of the air entering gas turbine compressor 453 is accurately controlled.

Figure 5:
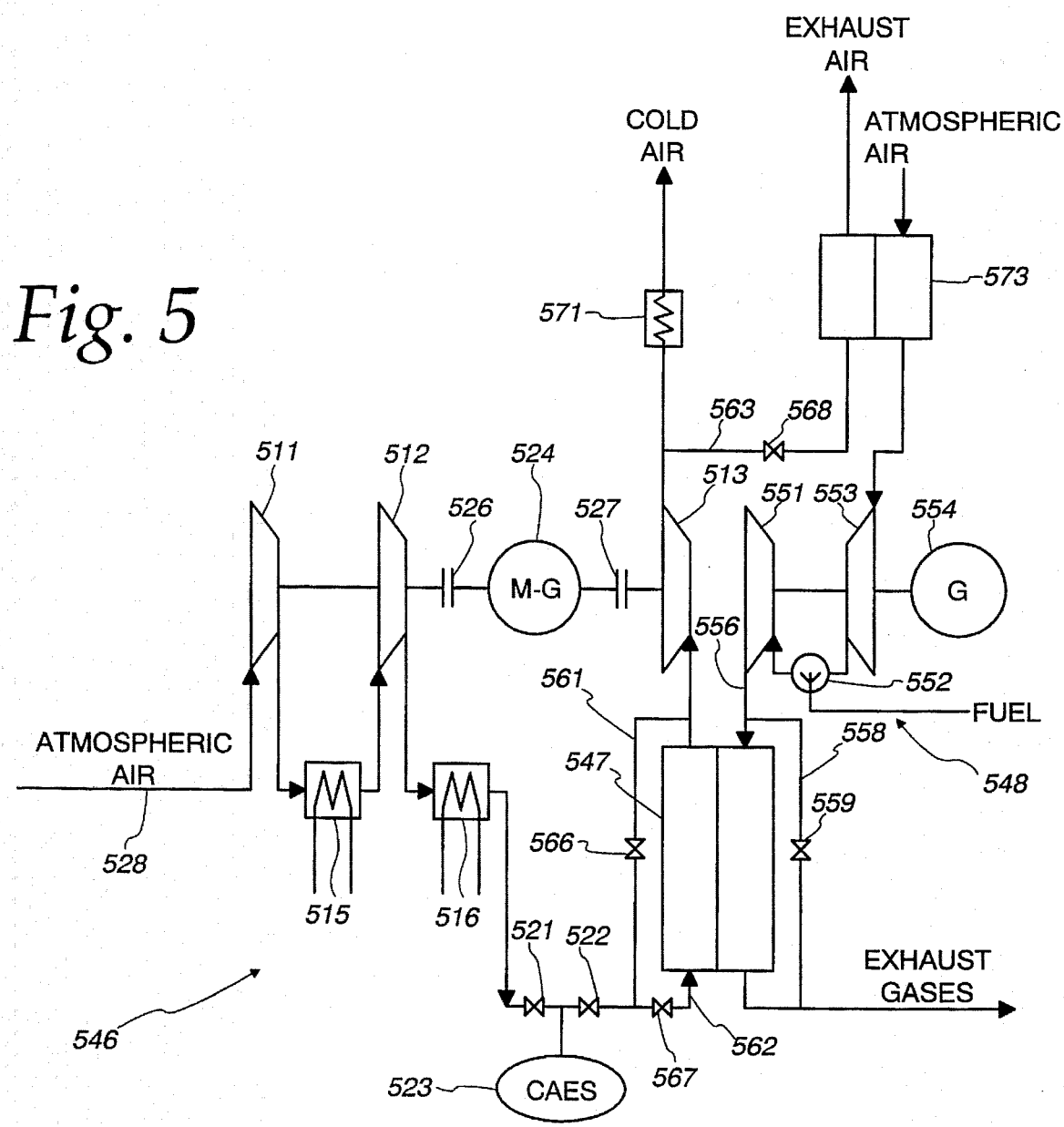

Reference is now being made to FIG. 5 which shows an embodiment of the invention which is very similar to that of FIG. 4. The embodiment of FIG. 5 differs from the embodiment of FIG. 4 in such a manner that rather than feeding exhaust air from expander 413 directly into gas turbine compressor 453, this exhaust air is passed through heat exchanger 573 where it cools the air entering gas turbine compressor 553. This embodiment is useful where, for example, there is oxygen depletion in the reservoir such as is the case where the reservoir is in an aquifer.

As will no doubt be clear to the artisan, the embodiments specifically described herein in the above text and in the annexed drawings, are exemplary, and should not be construed as limiting.

We claim:

1. A compressed air energy storage system comprising:
   a compressed air reservoir;
   a plurality of air compressor stages adapted for compression of atmospheric air;
   means for cooling air compressed in said air compressor stages;
   means for separating condensed water from said compressed atmospheric air;
   at least one air expander adapted for expansion of compressed air;
   heat transfer means for preheating said compressed air before expansion and heating expanded air egressing from said air expander, using heat derived from one of the class of external low grade heat sources including refrigerated substances, surrounding water, surrounding air, waste heat sources and solar energy;
   an electric motor-generator unit connected through clutches to said air compressor stages and air expander;
   lines with valves connecting said air compressor stages with said air expander and with said compressed air reservoir.

2. A system according to claim 1, wherein said means for cooling air and said heat transfer means are formed as heat exchangers with lines and valves connecting them with said air compressor stages and with said air expander.

3. A system according to claim 1, wherein said air compressor stages and said air expander are disposed to operate simultaneously.

4. A system according to claim 1, wherein said heat transfer means comprises a heat exchanger which derives heat from exhaust gases of a gas turbine, and has an exhaust gas side and a compressed air side.

5. A system according to claim 4, wherein said exhaust gas side of said heat exchanger has a bypass line with a valve allowing control of the flow of exhaust gases through said heat exchanger, whereby the gas turbine may be operated independently at times when the air expander is inactive.

6. A system according to claim 4, wherein said compressed air side of said heat exchanger has a bypass line with a valve allowing control of the flow of compressed air through said heat exchanger, whereby the temperature of the air entering said air expander may be controlled.

7. A system according to claim 6, further comprising an additional valve in series with said compressed air side of said heat exchanger for improved control of the flow of compressed air through said heat exchanger.

8. A system according to claim 4, further comprising means for cooling inlet air of a compressor of said gas turbine with exhaust air of said air expander.

9. A system according to claim 8, wherein said means for cooling inlet air of said gas turbine compressor comprises lines with valves disposed to transfer exhaust air of said air expander to an inlet duct of said gas turbine compressor for controlled mixing of the exhaust air with gas turbine compressor inlet air.

10. A system according to claim 8, wherein said means for cooling inlet air of said gas turbine compressor comprises a heat exchanger supplied with exhaust air from said air expander and with gas turbine compressor inlet air for transferring heat from said inlet air to said exhaust air and for providing said inlet air to an inlet duct of said gas turbine compressor.

11. A compressed air energy storage method, comprising the steps of:
    compressing a portion of atmospheric air in a plurality of stages;
    cooling said air portion after each stage of compression;
    separating condensed water from said air portion after said compression and cooling;
    storing said air portion;
    expanding said air portion in a plurality of stages while deriving work from said air portion; and
    preheating said air portion before expansion and reheating it after every stage of expansion using heat derived from one of the class of external low grade heat sources including refrigerated substances, surrounding water, surrounding air, waste heat sources, and solar energy.

* * * * *